June 2, 1936.  R. H. SMITH  2,043,076
FURROW DAMMING MACHINE
Filed Sept. 16, 1935   2 Sheets-Sheet 1
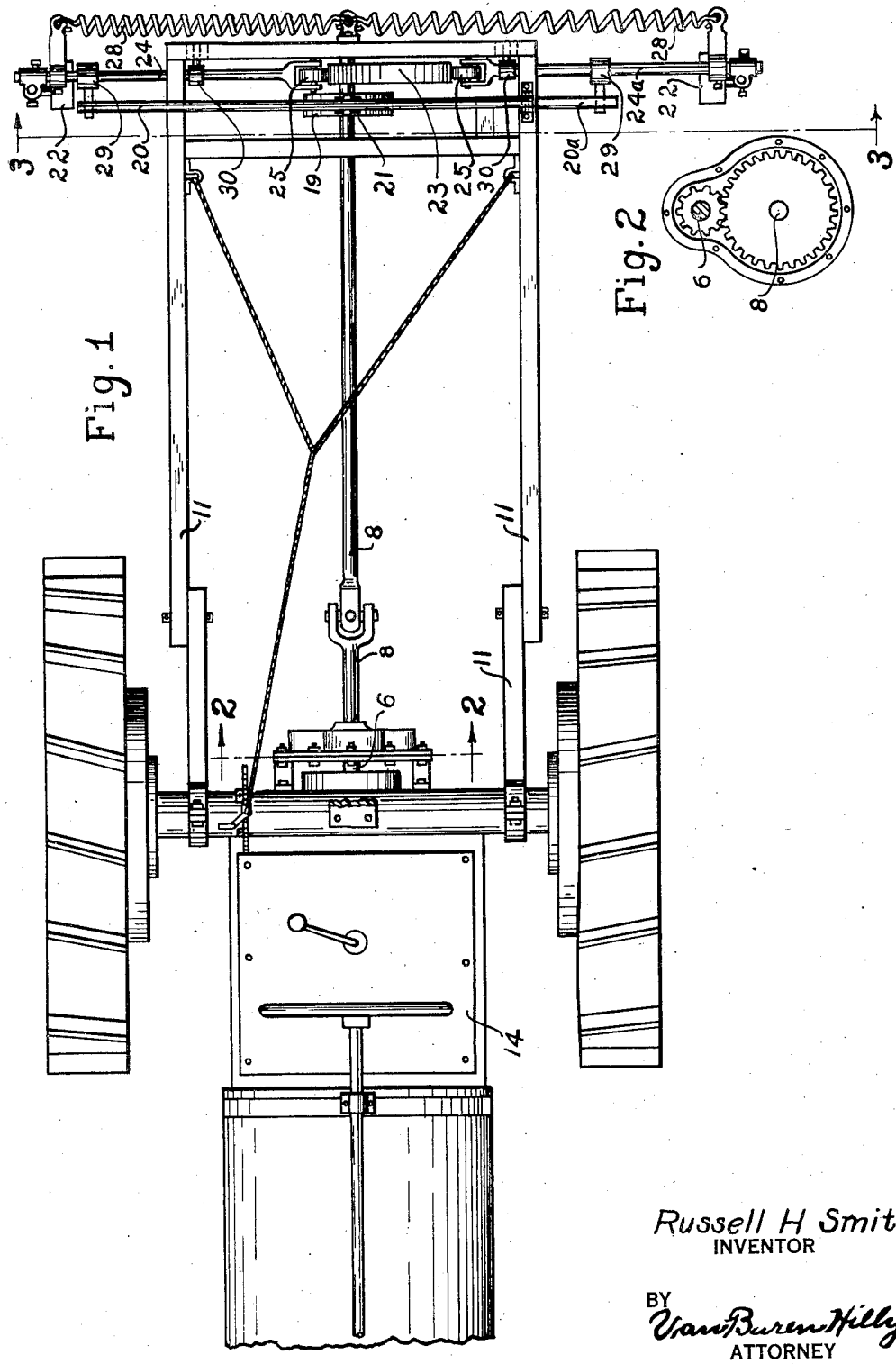
Russell H Smith
INVENTOR
BY
Van Buren Hillyard
ATTORNEY June 2, 1936.  R. H. SMITH  2,043,076
FURROW DAMMING MACHINE
Filed Sept. 16, 1935  2 Sheets-Sheet 2
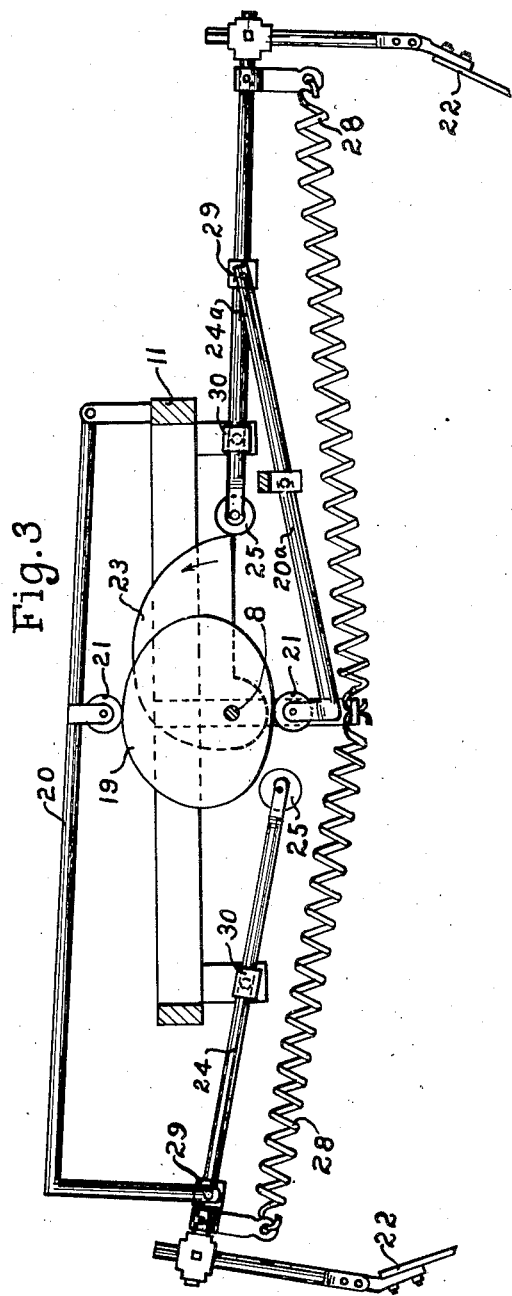
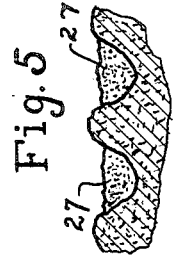
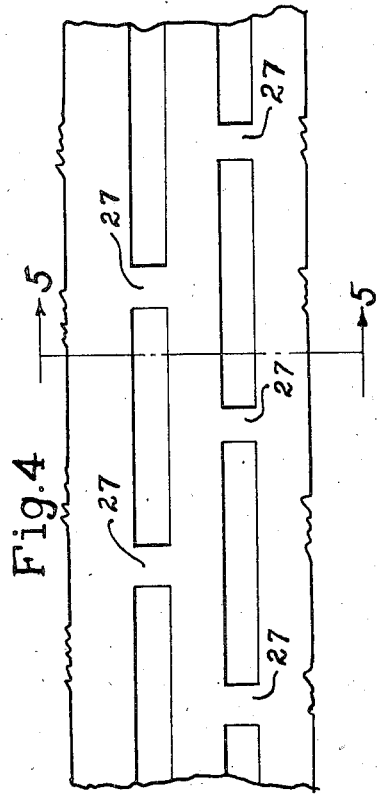
Russell H. Smith
INVENTOR
BY
Van Buren Hillyard
ATTORNEY Patented June 2, 1936

2,043,076

UNITED STATES PATENT OFFICE 2,043,076

FURROW DAMMING MACHINE

Russell H. Smith, Quanah, Tex., assignor of one-half to Alfred A. Lindsey, Quanah, Tex.

Application September 16, 1935, Serial No. 40,834

6 Claims. (Cl. 97—55)

The primary intent of this invention is the provision of machinery for obstructing the flow of water in furrows, thereby preventing the washing away of the top soil and assuring the absorption of the water to promote germinating of seed and growth of the plants.

The invention contemplates a machine in its entirety for forming and damming the furrows, or an attachment to be hitched to any type of machine, or drawn over a field to form the dams across the furrows, as may be desired.

While the drawings illustrate a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is a top plan view illustrative of an embodiment of the invention, the machine being in the nature of an attachment and hitched to a tractor.

Figure 2 is a sectional detail on the line 2—2 of Figure 1.

Figure 3 is a sectional view on the line 3—3 of Figure 1.

Figure 4 is a diagrammatic view.

Figure 5 is a sectional detail on the line 5—5 of Figure 4.

Corresponding and like parts are referred to in the following description and designated in the several views of the drawings by like reference characters.

The numeral 11 designates the frame of the machine which may be of any approved construction. A drive shaft 8 is mounted on the frame 11 and may be coupled to the drive shaft 6 of the tractor or implement 14 with which the machine is associated, in any determinate way.

Two cams 19 and 23 are mounted upon the shaft 8 and are rotatable therewith. The cam 19 is preferably ovoidal in shape, whereas the cam 23 is elongated and cut away on one side to permit a quick return of the part actuated thereby.

An arm 20 is pivotally mounted at one end on the frame 11 and its opposite end carrys a guide 29. A roller 21 intermediate the arm 20 engages the cam 19 and rides thereon. A second arm 20a below the frame 11 is pivoted thereto intermediate its ends and has a guide 29 at one end and a roller 21 at its inner or opposite end to engage the cam 19.

Other arms 24 and 24a are disposed at opposite sides of the frame 11 and project outwardly therefrom and carry hoes 22 at their outer ends and rollers 25 at their inner ends to engage the cam 23. Springs 28 normally urge the arms 24 and 24a inwardly and these arms are pivotally and slidably mounted in bearings 30 provided on the frame 11. The hoes 22 are adjustable vertically to adapt them to the surface over which the machine is propelled. The arms 20 and 20a receive only a pivotal movement through the action of the cam 19. The arms 24 and 24a receive a pivotal and sliding movement to carry the hoes 22 up and down and in and out, whereby to drag a portion of the earth at the side of a furrow across the latter to form a dam to obstruct the flow of water through the furrow and admit of the earth absorbing the moisture.

In practice, as the machine travels over the field, the shaft 8 is rotated and the cams 19 and 23 effect a combined pivotal and sliding movement of the arms 24 and 24a in the manner stated with the result that the hoes 22 are alternately raised, lowered, moved outward and drawn inward. When the hoes move outward and are lowered they engage the earth on the far side of the furrow. Upon the inward movement of the hoes 22, a portion of the earth is drawn across the furrow and forms a dam 27 which obstructs the flow of water and prevents the washing away of the light soil and traps the water which is absorbed by the earth. In this manner, the light top soil is prevented from blowing away and the moisture retained to promote seed germination and plant growth.

Having thus described the invention, what I claim is:

1. A machine of the character specified comprising a frame, a hoe pivotally and slidably mounted on the frame, means for raising and lowering the hoe, other means for moving the hoe transversely across a furrow when raised, and independent means for moving the hoe inwardly when lowered to draw a portion of the earth at the side of the furrow across the latter to form a dam.

2. A machine of the character specified comprising a frame, an arm pivotally mounted on the frame, a second arm slidably engaging the first mentioned arm and provided with a hoe, means pivotally actuating the first mentioned arm to raise and lower the hoe, other means for sliding the second arm, outwardly when raised to move the hoe across the furrow, and independent means for moving the hoe inwardly when lowered to draw a portion of the earth at the side of the furrow thereacross to form a dam.

3. A machine of the character specified comprising a frame, an arm pivotally mounted in the frame, a second arm slidably engaging the first mentioned arm and provided with a hoe, a cam coacting with the first mentioned arm to raise and lower the hoe, a second cam for moving the second arm to carry the hoe across the furrow, and independent means for returning the second arm back across the furrow to form a dam therein.

4. A machine of the character described comprising a frame, upper and lower arms pivoted on the frame, other arms pivotally and slidably mounted on the frame and slidably engaging the pivoted arms and provided at their outer ends with hoes, a cam operating between the pivoted arms to effect a raising and lowering of the hoes, a second cam operating between the inner ends of the hoe carrying arms to move them to carry the hoes across the furrows, and spring means for reversing said hoe carrying arms to carry the hoes back across the furrows to form dams therein for obstructing the flow of water therethrough.

5. A machine of the character described comprising a frame, an arm above and pivoted at one end to the frame and having its opposite end extended and provided with a guide, a companion arm below and pivoted between its ends to the frame and extended and carrying a guide, opposite arms pivotally and slidably mounted on the frame and slidably engaging the guides of the before-mentioned pivoted arms and having hoes at their outer ends, a cam between the pivoted arms to raise and lower the hoes, a cam between the inner ends of the said opposite arms to slide them to carry the hoes across the furrows and spring means for reversing the hoe carrying arms to carry the hoes back across the furrows.

6. A machine of the character described comprising a frame, an arm above and pivoted at one end to the frame and having its opposite end extended and provided with a guide, a companion arm below and pivoted between its ends to the frame and extended and carrying a guide, opposite arms pivotally and slidably mounted on the frame and slidably engaging the guides of the before-mentioned pivoted arms and having hoes at their outer ends, a longitudinal shaft on the frame, cams on the shaft and rotatable therewith, one of the cams effecting a pivotal movement of the said upper and lower arms to raise and lower the hoes, and the other cam effecting a sliding outward of said opposite arms, and springs for moving said opposite arms inward to carry the hoes across the furrow to form a dam therein.

RUSSELL H. SMITH.